July 3, 1962 C. E. GILBERT, SR., ETAL 3,042,460
SLIDE BEARING CONSTRUCTION

Filed July 15, 1960 3 Sheets-Sheet 1

INVENTORS.
Charles E. Gilbert, Sr.
BY Donald Winget, Jr.
Wood, Herron & Evans,
ATTORNEYS.

INVENTORS.
Charles E. Gilbert, Sr.
BY Donald Winget, Jr.
Wood, Herron & Evans.
ATTORNEYS.

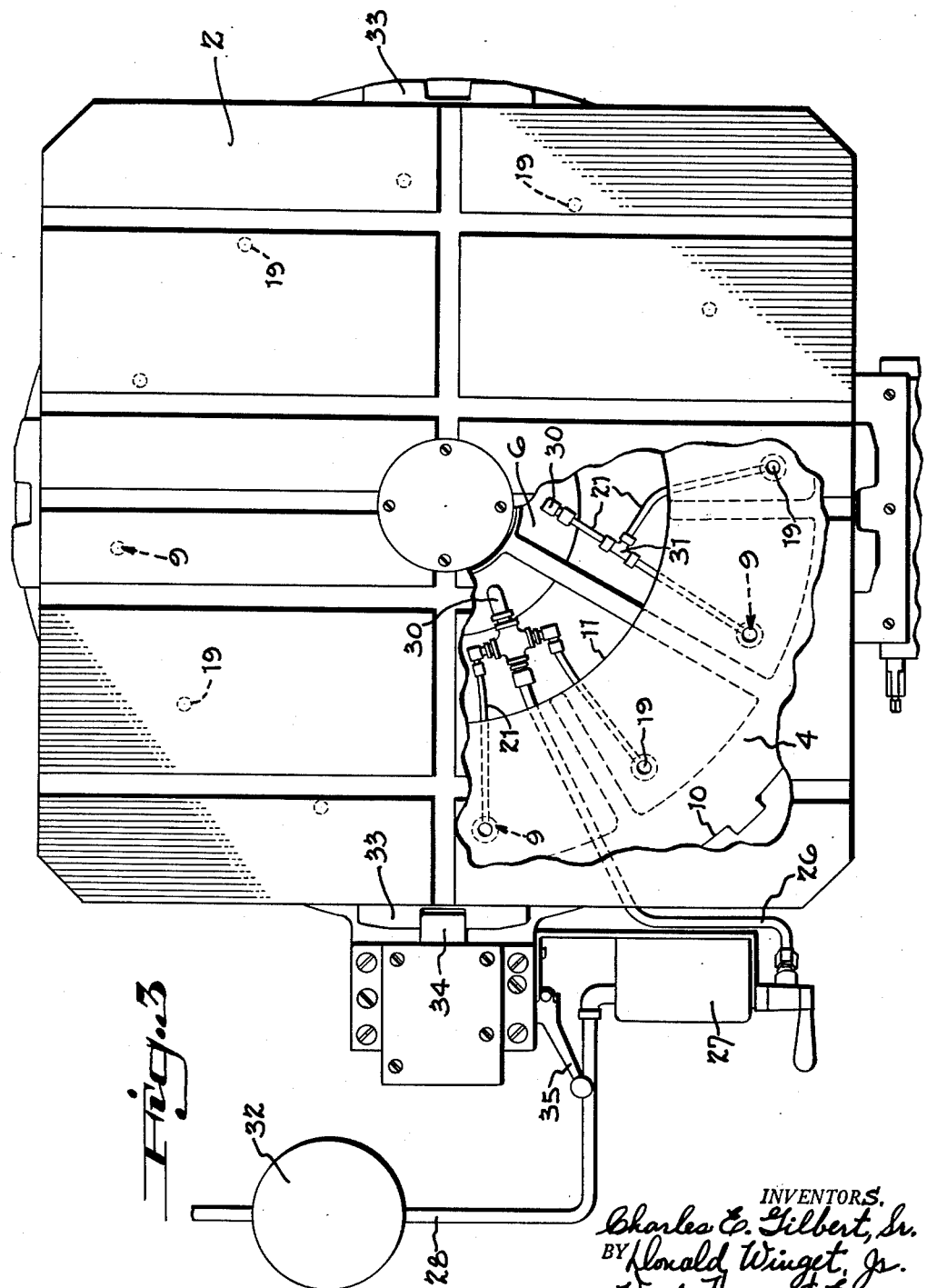

3,042,460
SLIDE BEARING CONSTRUCTION
Charles E. Gilbert, Sr., and Donald Winget, Jr., Cincinnati, Ohio, assignors to Cincinnati Gilbert Machine Tool Company, a corporation of Ohio
Filed July 15, 1960, Ser. No. 43,195
6 Claims. (Cl. 308—9)

This invention relates to an improved precision slide bearing construction wherein a layer of air is maintained between two relatively moving members which constitute the bearing so as to minimize the friction otherwise restraining movement of the one bearing member relative to the other.

In a typical slide bearing construction, such as is employed, for example, in a machine or machine tool where one member moves upon and is supported by another, lubrication to minimize friction and wear is provided by the establishment of a film of lubricating oil between the facial surfaces at which the relative movement occurs. However, where the unit bearing pressure is high, or uneven, as is particularly the case in machine tools where the bearing must sustain a workpiece of great weight as well as the forces exerted on it during cutting, the lubricant between the bearing faces tends to be squeezed away and the film of oil, or certain areas of it, becomes expelled or too thin to perform its intended function; excessive friction and wear then take place. On this account it is not uncommon in modern machine construction to employ high pressure lubricant systems but these inherently involve copious flow of oil and its attendant loss and messiness.

So-called air bearings have been proposed wherein one member of a bearing is maintained in slightly spaced relationship to the other member of the bearing by means of a film of air under pressure, and the fact has been recognized that bearing friction is virtually eliminated with this type of structure. However, no means heretofore has been known for maintaining precise uniformity in the thickness of the air film or the relative spacing of the moving member with respect to the other member of the bearing, especially under conditions in which the load the bearing must sustain varies throughout successive stages of the relative movement of the parts. Under such variations, for example, air, like lubricating oil, may be squeezed or expelled from certain areas where the force upon the bearing is high. Conversely, if or as the floating load subsides, the one member of the bearing may shift bodily with respect to the other under the lifting effect of the same air pressure, with resultant inaccuracy in the position of the movable bearing member and the workpiece or other elements which may be associated with it. Flutter of one member of the bearing relative to the other may also occur in air bearings, due to build up of air pressure, followed by separation or canting of the parts which in turn allows air to escape from between the bearing surfaces whereupon they move together for repetition of the sequence. Even where flutter conditions do not exist, the consumption of the air required to maintain separation of the bearing parts of past air bearings has been undesirably high.

The principal objective of this invention has been to provide a bearing construction wherein air under pressure is employed to maintain a virtually frictionless layer or film of air between relatively movable members constituting the bearing, and wherein oil or other liquid is introduced into the air interface of the bearing to act as a seal preventing excessive escape of air from the bearing margins and to dampen or suppress fluctuations in the thickness of the air interface which might otherwise occur under varying load conditions.

A further important objective of this invention has been to provide a slide bearing construction wherein air is employed as the principal anti-friction lubricant but wherein the supply of air to the bearing interface area is automatically controlled or regulated to maintain an air film of substantially uniform thickness regardless of fluctuations in the loading of the bearing or of fluctuations in the unit bearing pressure.

More specifically, an objective of this invention has been to provide an air slide bearing construction having automatically operable means for admitting a supply of air under pressure, as required to maintain uniformity of the thickness of the film of air on which the one bearing member slides or moves relative to the other and a supply of liquid to the bearing interface, as required to maintain, at least at the bearing margins, a liquid seal which is effective to minimize air escape and thereby minimize the consumption of compressed air required to serve or maintain the bearing under severe variations in the load conditions to which the bearing is subjected.

The slide bearing construction of the present invention is adapted for many different purposes. By way of illustrating one embodiment, the invention is disclosed in relation to a slide bearing for a rotary table of or for a machine tool. A typical rotary table comprises a stationary base and the movable table member rotatably sustained upon it, in conjunction with manual or power means for moving the table to various radially angular positions. In typical usage a workpiece such as a casting is fastened upon the table and one face of the workpiece is machined after which the table is rotated to present another face or area of the workpiece to the cutting tool. While the work piece is generally centered upon the table, many castings, including some which are very heavy, are unsymmetrical or may be too large to be centered upon the table. In this event it is apparent that certain areas of the table bearing will be subjected to much higher loads than other areas. In such respect, this embodiment of the invention represents one of the most adverse conditions of usage, especially since friction must be minimized without sacrifice of accuracy or precision of operation.

Briefly, the slide bearings of this invention comprise cooperable members presenting meeting faces which may be either coextensive or non-coextensive but which constitute or define a bearing interface therebetween, and a plurality of valves in one of said members which are positionally responsive to the bearing surface of the other of said members, for admitting air under pressure to the interface according to the separation or proximity of the members relative to one another. The invention also contemplates a construction of this type having means for supplying or maintaining a controlled or regulated amount of liquid sealant at the bearing area. In the preferred construction the valves comprise ports respectively connected to a supply of compressed air (or other suitably inert compressed gas) and valve members for closing said ports, but with such valve members, or parts associated therewith, projecting beyond the bearing surface of the bearing member in which they are installed a predetermined distance corresponding to the thickness of the bearing air film which is to be maintained. The valves normally are partially open so long as an air film of predetermined thickness exists between the two bearing surfaces. However, if increase of the load upon the bearing occurs, in consequence of which air is compressed or squeezed from the interfacial area or any portion thereof, and the film thickness is thereby reduced, then the member subjected to the load, in approaching the other member of the bearing, further actuates the valve or valves thereof, either selectively or collectively according to load distribution and thereby automatically opens such valves to admit more air until the desired air film thickness condition is restored, whereupon the air admission is then diminished or cut off by partial closure or reseating.

In the preferred construction the valve members are spaced from one another throughout the bearing area such that each valve will supply air at least to the bearing area locally surrounding it. For example, in a rotary table a plurality of the valves may be located in a pattern over the annular bearing surface of the base member of the table. In the simplest arrangement each valve closure member may be in the form of a movable ball cooperable with a stationary valve seat, but with a portion of the ball circumference projecting above the table bearing surface a slight distance corresponding to the desired air film thickness, for example, .001" to .003". The respective valves may be supplied with air under pressure from a common conduit. Should any part of the bearing surface of the movable table come into proximity of the bearing surface of the base a distance less than the distance the valve members project therefrom under conditions of normal film thickness, either because of unsymmetrical distribution of the workpiece weight upon the base or because of a cutting load exerted upon a local area thereof off-set from the axis of the table, then the valve or those valves in the area of reduced air film thickness will be moved to more fully open position and thereby admit more air to restore the desired film thickness. Such restoration is accomplished almost so instantaneously that significant table movement is eliminated.

In the preferred construction, liquid lubricant, such as lubricating oil, is admitted to the bearing interface conjointly with admission of air thereto, as by atomizing or misting the liquid lubricant into the air which is to be supplied to the bearing, such that each admission of air to the bearing through the opening of a valve automatically will also cause oil to be introduced therewith.

Other features and advantages of the present invention will appear in the following detailed description of the drawings which illustrate the typical embodiment previously discussed. In the drawings:

FIG. 3 is a plan view of the rotary table shown in FIG. 2 with a portion cut away to show the lower bearing construction.

in FIG. 4 the valve is shown in the fully closed position, in FIG. 5 the valve is shown in fully open position (admitting full flow of air), and in FIG. 6 the valve is in partially open position admitting air to the air bearing.

Figure 1:
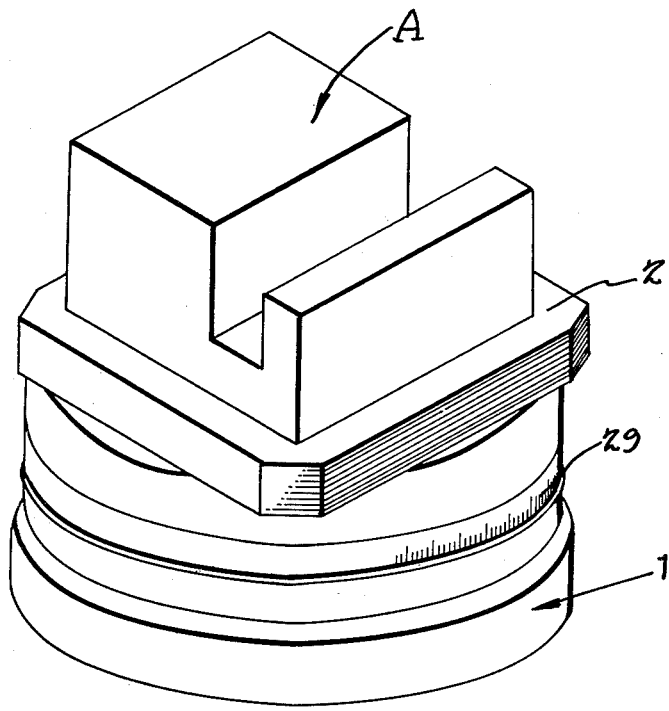
FIG. 1 is a perspective view of a rotary table having a workpiece mounted thereon for purposes of illustration as subsequently explained.

The table structure illustrated in FIG. 1 comprises a base member 1 having a worktable 2 rotatably mounted thereon. The assembly of base and worktable is adapted to be mounted upon a bed or supporting surface of a machine tool beneath or adjacent a cutting tool thereof. For this purpose the base casting 1 is slotted to receive keys 3 which are adapted to be received in keyways of the main bed or table of the machine and also may have slotted feet or other hold-down devices rigidly fastening the assembly in position on the machine. The upper surface of the worktable 2 in turn, contains T-slots adapted to receive headed bolts or other suitable hold-down means by which a workpiece, as indicated generally at "A" may be secured thereto.

The upper surface of the base casting 1 is machined to present a smooth, true annular bearing face 4, while the lower surface of the worktable casting 2 is machined to present a true, smooth annular bearing surface 5. As is also conventional, the base casting 1 has a hub 6 at its central portion which is bored as at 7 to receive a stub shaft 8 or kingpin extending downwardly into the bore 7 to furnish the rotary bearing about the axis of which the upper table 2 turns with respect to the base casting. The kingpin thus guides the table against lateral displacement while the weight load is carried on the facial surfaces 4 and 5 constituting the bearing to which the present invention is directed. (In conventional constructions these surfaces bear directly one against the other, with only a film of oil or grease applied for lubrication.)

To provide the air bearing of this invention, the base casting is equipped with a series of valves which are indicated generally at 9. These valves are distributed throughout the surface of one of the bearing faces, e.g. the bearing face 4 in the embodiment shown and, the valves preferably are spaced substantially uniformly from one another. As shown, they reside between the inner and outer extremities 10 and 11 of the bearing 4, approximately, though not necessarily, midway of the bearing margins.

Figure 4:
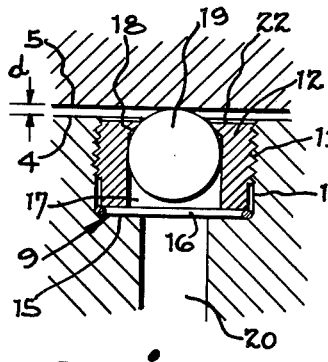
FIGS. 4, 5 and 6 are fragmentary sectional views on an enlarged scale through one of the air valves forming part of the bearing construction.
Figure 5:
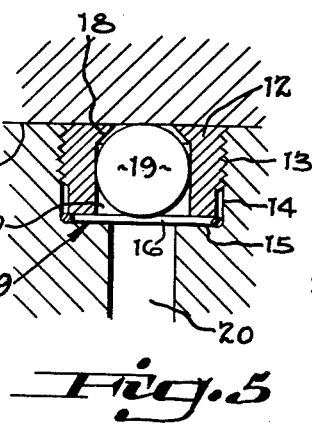
Figure 6:
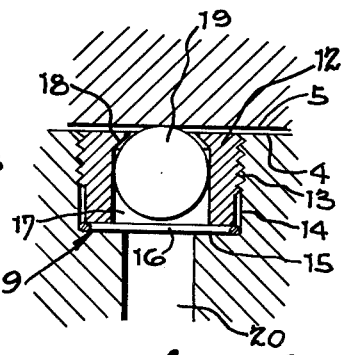
Figure 2:
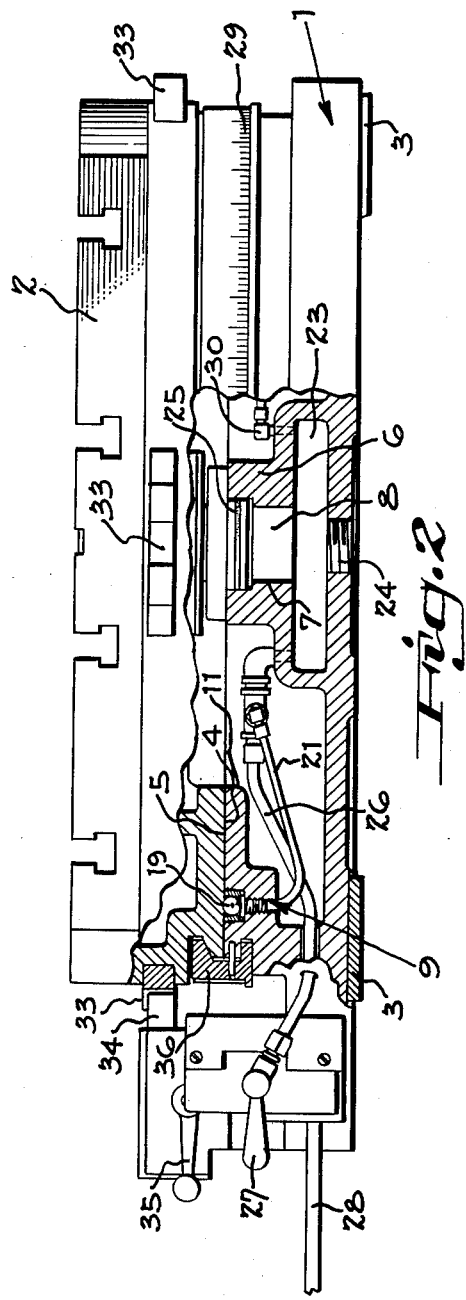
FIG. 2 is a side view of a rotary table partly broken away to show the improved slide bearing construction of the present invention.

Each of the valves 9 comprises a seat member 12 which is in the form of a thimble threaded as at 13 for reception in a bore 14 extending into the base casting 1 from the bearing surface 4 thereof. The bore 14 terminates in a shoulder 15 which forms a seat for a gasket or washer 16 to provide a pressure-tight connection of the thimble to the base 1. Thus, gasket 16 may be in the form of a compressible rubber gasket, or "O-ring." The thimble 12 in turn is bored internally to provide a case 17 and seat 18 for a valve ball 19. Bore 14 communicates with a bore 20 extending through the base casting for threaded connection with an air supply conduit 21, while the thimble 12, at a point above the seat 18 is open to permit flow of air through the valve when the valve ball 19 is spaced from the seat 18. In addition, the axial position of the seat 18 relative to the diameter (or shape) of valve member 19 is such that when the ball is fully seated against seat 18 a portion of the ball circumference projects a slight distance above or beyond the bearing surface 4. This distance, indicated at "d" in FIG. 4, corresponds on greatly exaggerated scale to the thickness of an air film which is to be maintained between the bearing surfaces 4 and 5 in air operation of the bearing.

In the preferred construction the opening in the top of the thimble 12 through which air is free to escape past the valve may be in the form of a hexagonal opening or key slot adapted for reception of an Allen wrench or the like whereby a pin wrench introduced into a thimble may be employed to rotate the threaded thimble so as to raise or lower the position of the valve seat 18. In this manner the amount of projection of the ball circumference, which in turn determines the thickness of the air film to be maintained at the bearing interface, readily may be adjusted.

For normal service all of the valve balls 19 are set to project uniformly from the bearing surface 4. The accurate settings readily may be established by means of a dial indicator or the like rested upon the flat surface of the bearing 4 so as to measure the extent of projection of each ball. It will also be noted that the thimbles 12 are dimensioned as to length such that the upper surfaces 22 thereof reside below the plane of the bearing surface 4 to permit some latitude in the adjust range.

Compressed air may be supplied to the valves through conduits 21 in any suitable piping arrangement which, of course, may vary according to the number and distribution of the valves. In the construction wherein the air valves are used in a rotary table as illustrated, air supply piping may be simplified by utilization of the hub 6 of base member 1 as an air supply manifold. For this purpose the lower portion of the hub is chambered as at 23, the bottom opening into the chamber, if one may be required for machining purposes, is plugged as at 24 and any suitable O-ring or pressure gasket 25 is installed around the kingpin 8. Air is supplied to the manifold 23 from a supply line 26 which is connected to a main air control valve 27 which in turn is furnished with compressed air through a main supply line 28. The valve 27 may have an "exhaust" position if desired to provide for escape of air from the bearing as may be required to permit rigid clamping of the table to the base in certain machining operations. While some of the conduits 21 leading to the individual valves of the bearing may be tapped into side outlets of the supply pipe 26 as is shown to the left in FIG. 3, other supply conduits 21 to the individual valves may be connected to elbows 30 communicating with the manifold 23. Similarly the conduits 21 may be branched at T's 31 to serve more than one valve. Even for bearings of substantial size, the air consumption is very low and therefore only small supply lines are required which readily may be fabricated from copper tubing or the like.

As previously described, the introduction of a liquid such as oil to the air film at the bearing interface, though it has no function as a lubricant, peculiarly and unexpectedly improves the operating performance of the air bearing. Through its presence, fluctuations of air film thickness which might otherwise occur are greatly reduced, as is the quantity of compressed air required to maintain the air bearing in operative condition. In general, movement of the one bearing member relative to the other is dampened or suppressed and flutter is absent. It is believed that such results are obtained by reason of the action of the liquid as a mobile barrier which restricts free movement or escape of the air. For example, with the introduction of a lubricating oil into the air film it is believed that some of the oil, through its wetting of and cohesion to the closely spaced bearing surfaces, bridges the same in pillar-like fashion throughout various areas of the bearing, depending upon how much oil was introduced. As air is admitted from time to time to the bearing interface through the valves, the pressure of the air causes migration of the gasketing fluid toward the bearing margins where the bridge or pillar becomes a substantially continuous but mobile gasket preventing at least unrestricted escape of the air from the air film. From time to time oil does ooze from the bearing margins or it may be physically expelled under the influence of the air pressure, but an overall dampening action is exerted to restrain or discourage movement of one bearing face away from the other and thereby greater uniformity in the maintained thickness of the air film is achieved.

The viscosity or physical properties of the sealant selected for use will depend, of course, on the air pressure employed, the air film thickness to be maintained and the unit bearing pressures which are to be sustained by the air bearing.

In the preferred construction in the present invention, the sealant, for example, common lubricating oil, may be introduced to the air interface in limited and controlled amounts by atomizing the oil and incorporating it into the air stream as an incident to the flow of air into the bearing or as an incident to the flow of air into the air supply conduit system or manifold. It is well known, for example, that air moving at substantial velocity past a wick saturated with oil will thereby acquire a mist of oil. For this purpose, the commercial so-called Norgren oiler, manufactured by C. A. Norgren Co., Englewood, Colorado, is suitable. This oiler may suitably be installed directly in the air line 28 as is shown diagrammatically at 32 in FIG. 3. It will be understood that only very small quantities of oil need be introduced to the bearing from time to time to supply, furnish or replenish the small amount which is all that is required to provide the beneficial dampening effect. Since subdivision of oil inherently takes place at the relatively high velocity and turbulence of the air as it passes through the minute openings of the valves when they are called upon to admit air to the interface, preatomization of the oil is not essential and the liquid may be introduced in various ways other than the one just discussed. It will also be noted that the presence of the sealant, since it is mobile, does not interfere with clamp-down of the table on the bed whenever that is required to provide utmost rigidity during machining.

In reference to FIG. 1 it will be noticed that the workpiece "A" therein illustrated is neither symmetrical nor disposed relative to the axis of the bearing for uniform distribution of its weight over the bearing surface. Thus the heavy mass to the left exerts upon the areas of the bearing which are directly underneath it, a load considerably higher than that existing at the right. Since air pressure will be substantially uniform throughout the entire area of the interface, then under given air pressure conditions it will be seen that the interface will inevitably tend to be thinner at the areas of relatively higher unit bearing pressure. In other words, the table will tend to be canted, even though ever so slightly, with the left side as shown in FIG. 1 being relatively higher than the right side in the same figure. Whenever any portion of the bearing surface moves toward the companion bearing member 5 sufficiently to actuate the valve closure member of a valve at such area, whether the movement be for reasons as those just given or for any other reason, the affected valves will be moved to more fully open position and an increased supply of air will be admitted to restore film thickness at least at the areas surrounding that valve. If conditions of symmetry exist such that the air film is reduced in thickness over its entire area because of weight or applied force then all of the valves will respond uniformly.

As soon as film thickness is restored the valves automatically return to their partially open original positions. Equilibrium in the bearing thereby automatically is maintained, but without any flutter effect which might otherwise occur if these actions occurred at relatively high frequency.

In this manner it will be seen that the table is freely movable upon the base, such that only slight manual exertion sufficient to overcome the mass inertia, will rotate the table to any given index setting. For indexing the table may be graduated, as at 29 or equipped with fixed or adjustable stop dogs 33 adapted for abutment against a positive stop 34 which may be moved into or out of position by means of a lever 35 as is conventional. For face milling operations or the like it is also common practice to clamp the table positively in its indexed position, for which purpose a suitably operated clamp ring 36 may be provided for actuation in any suitable manner. Rotary tables also are commonly provided with power drive means (not here shown) either for power indexing or for continuous rotation of the table under power so as to enable its usage for boring or turning operations. In the latter usage, it will be apparent that even though the weight load of the workpiece may be distributed uniformly over the air bearing, a local thrust upon the air film is exerted at a point below or adjacent to cutting tool applied to the workpiece. Such uneven thrust is accommodated without significant positional displacement of the workpiece in the manner previously described.

In the embodiment disclosed the cooperative bearing faces 4 or 5 are coextensive. However, it will be understood that any valves in one bearing member residing beyond the margins of the other bearing member will be closed and will remain inactive unless or until they are actuated by passage of the other bearing member over them. The invention may be employed in constructions wherein one of the members of the bearing assembly is in the form of an elongated linear or annular surface while the other of the members is of considerably shorter length and adapted to traverse the former. In that case, as the one bearing member passes over the other, the valves progressively open as they are traversed so as to establish or continuously maintain an air film which, in effect, advances progressively between the mating bearing surfaces. In any of the various embodiments to which the invention is adapted for use, the valves may be installed in the movable member, e.g., in worktable 2, instead of the stationary member if desired, to provide similar results.

Having described our invention, we claim:

1. A slide bearing construction comprising first and second members presenting respective planar bearing faces which are cooperable with one another to support a load, one of said members being relatively movable with respect to the other, one of said members having a plurality of normally closed valve means located in spaced relation to one another at the bearing face of said member, each of said valve means being positionally operable to open position by engagement with the other of said bearing faces when the spacing between the two faces is less than a predetermined distance, means for supplying said valve means with compressed gas whereby a film of said gas corresponding in thickness to said predetermined distance may be established and maintained between said faces in response to valve actuation, and means providing a mobile liquid at least at the margins of the area over which said faces are in engagement with each other to impede the escape of compressed gas from the margins of said area.

2. Slide bearing construction comprising first and second members presenting cooperable surfaces defining a planar interface therebetween, one of said members being relatively slidable upon said bearing interface over the other of said members, one of said members having a plurality of normally closed valves therein, each of the said valves including a movable valve part having a portion projecting beyond the said face of said member, the said valve part being movable to open said valve upon engagement with the other of said faces when the said faces are spaced less than a predetermined distance from one another, means for supplying compressed gas to said valves, and means for introducing oil into the space between said faces for establishing and maintaining a mobile liquid at least at the margins of the said bearing interface to impede escape of gas from the space between said faces.

3. A slide bearing construction comprising first and second members presenting bearing faces defining a planar bearing interface therebetween, means for maintaining a film of compressed gas of predetermined thickness between said bearing faces over the area of said bearing interface, said means comprising a plurality of valve means located in spaced relation to one another in one of said members, said valve means being normally closed but positionally responsive and movable to open position by the bearing face of the other of said members when the said bearing faces thereof are spaced from one another less than a distance corresponding to the thickness of the gas film which is to be maintained therebetween, means for supplying compressed gas to said valve means, and means for introducing oil into at least the marginal areas of said bearing interface, whereby one of said members is sustained upon the other for relative movement in a direction in the plane of said interface through the pressure of the gas in said film and whereby the oil within said interface dampens relative movement of said members in a direction normal to said interface.

4. A slide bearing construction comprising first and second members presenting planar bearing faces defining a bearing interface therebetween and means for maintaining a film of predetermined thickness of compressed gas between said bearing faces at said bearing interface, said means comprising a plurality of valve means located in spaced relation to one another in one of said members, said valve means being normally closed but positionally responsive for movement to open position by the bearing face of the other of said members when said faces are spaced from one another less than a distance corresponding to the thickness of the gas film which is to be maintained therebetween, means for supplying compressed gas to said valve means, and means operable automatically in response to operation of said valve means for introducing oil into said bearing interface.

5. A slide bearing construction comprising first and second members presenting planar bearing faces defining a bearing interface therebetween and a plurality of valve means located in spaced relation to one another in one of said members for maintaining a film of compressed gas of predetermined thickness between said bearing faces at said bearing interface, said valve means being positionally responsive for movement to more fully open position by the bearing face of the other of said members when said bearing faces are spaced from one another less than a distance corresponding to the thickness of the gas film which is to be maintaned therebetween, means for supplying compressed gas to said valve means, and means for introducing an oleaginous liquid into said bearing interface in a fine state of subdivision through said valve means.

6. Slide bearing construction comprising first and second members presenting planar bearing surfaces defining a bearing interface therebetween, the face of one of the said members being relatively slidable over the face of the other of said members, at least one of said members having a plurality of valve means located therein in spaced relation to one another, the said valve means being of the ball-check type and each comprising a ball having a portion of its circumference projecting a predetermined distance beyond the bearing face of the said member in which it is installed when said valve is in closed position, the said ball being effective to open the said valve upon engagement of the said projecting portion of the ball with the face of the other of said members, means for supplying compressed gas to said valve means, and means for establishing and maintaining a mobile liquid gasket at least at the margins of the said bearing interface to impede escape of compressed gas from the margins of said interface.

References Cited in the file of this patent

UNITED STATES PATENTS

| 303,813 | Cousins | Aug. 19, 1884 |
| 2,442,202 | Hughes-Clay | May 25, 1948 |
| 2,868,593 | Jones | Jan. 13, 1959 |
| 2,942,385 | Pal | June 28, 1960 |
| 2,976,087 | Cherubim | Mar. 21, 1961 |

FOREIGN PATENTS

| 548,363 | Great Britain | Oct. 7, 1942 |